United States Patent Office 3,341,082
Patented Sept. 12, 1967

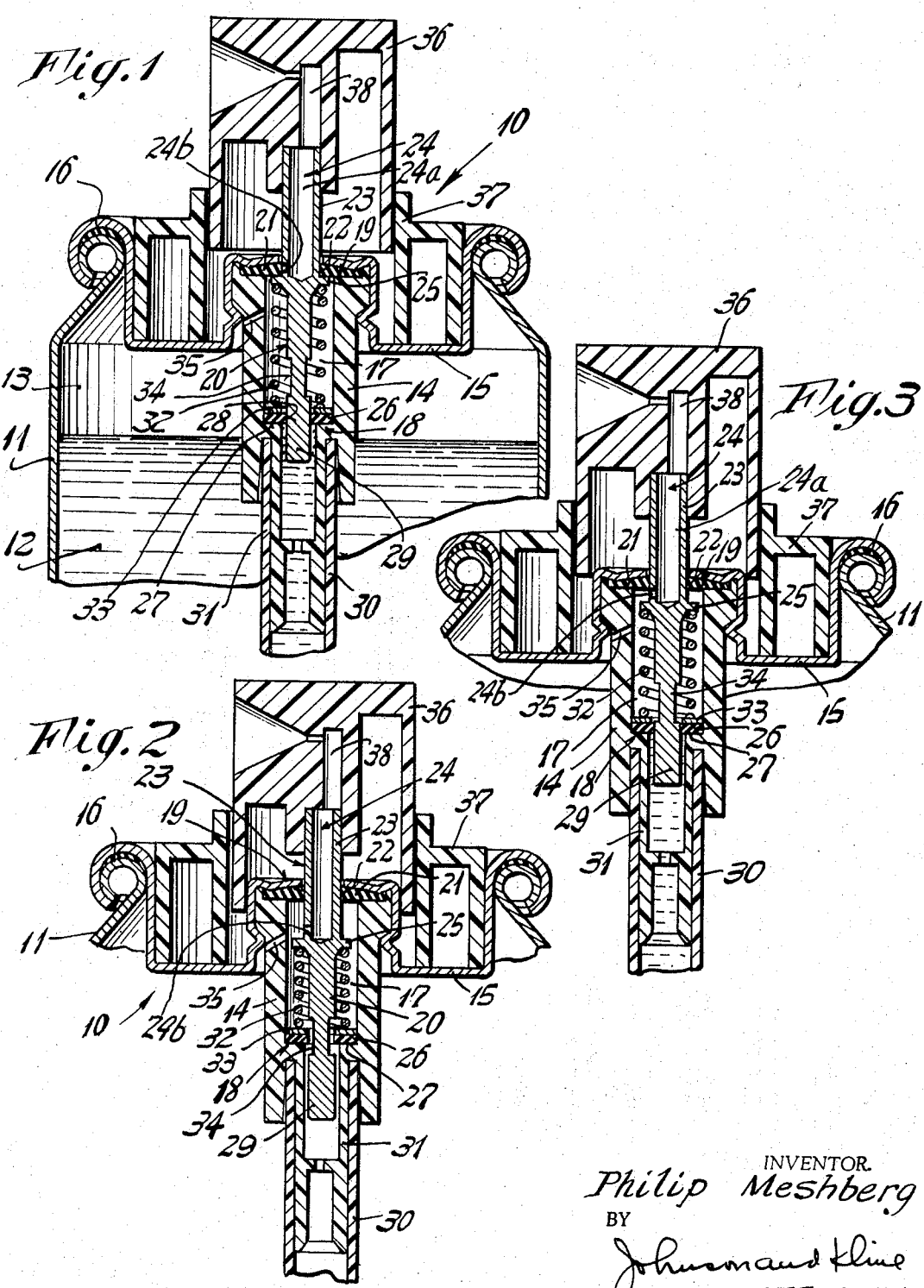

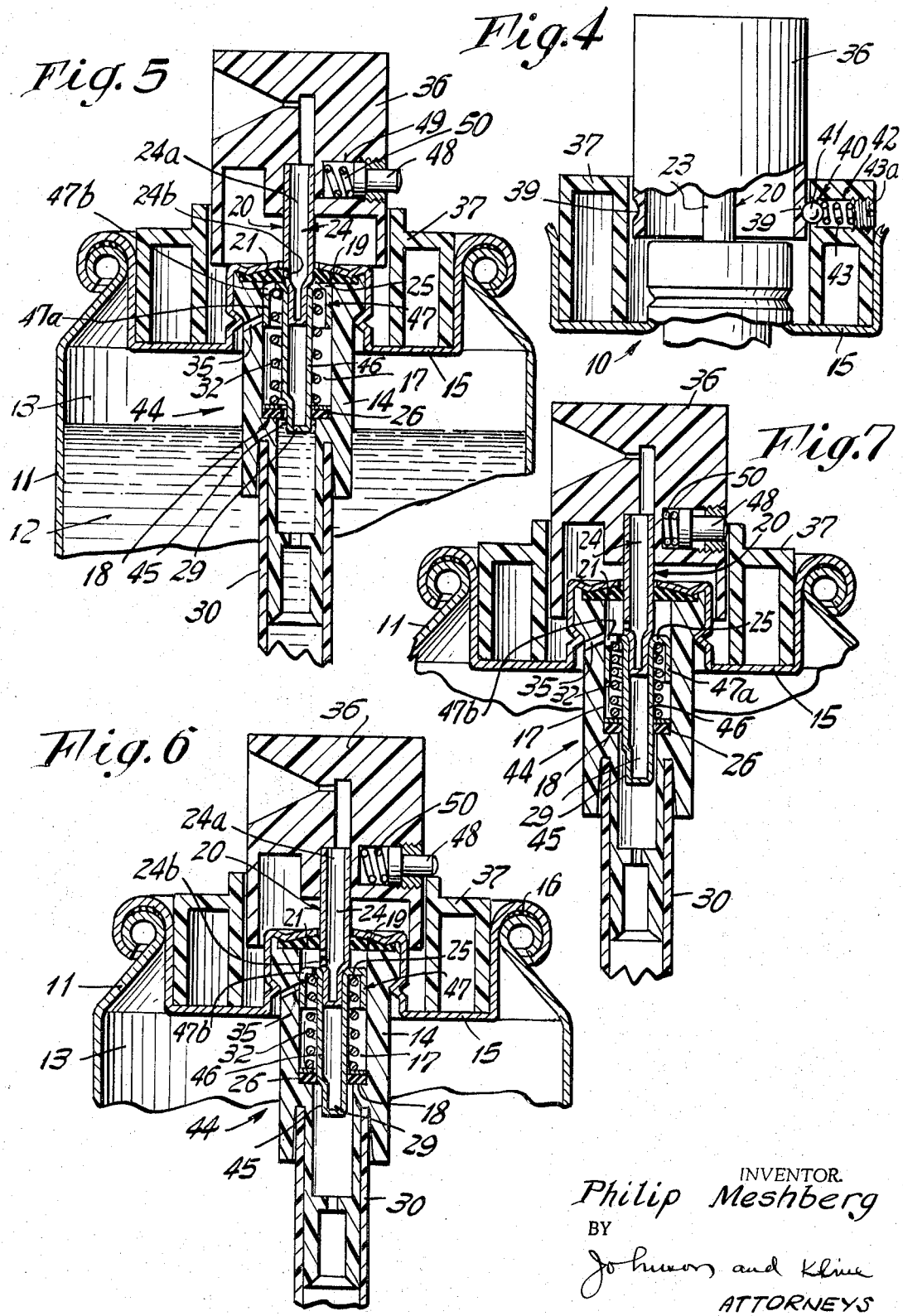

3,341,082
DISPENSING DEVICE WITH PURGING MEANS
Philip Meshberg, 15 Stoneleigh Road,
Fairfield, Conn. 06430
Filed Jan. 24, 1966, Ser. No. 522,512
7 Claims. (Cl. 222—148)

ABSTRACT OF THE DISCLOSURE

An aerosol valve for dispensing metered quantities of material under pressure from a container, said valve being provided with a housing forming a measuring chamber and a reciprocating valve stem for controlling the dispensing of the material from said chamber in response to inward movement thereof from a normal position, which housing has a purging port communicating the chamber with a gas in the container which port is normally sealed by means controlled by said valve stem until the measured quantity of material is dispensed from the housing after which the purging port is unsealed and the gas purges any material left in the valve.

---

An important object of the invention is to provide a dispensing device for discharging from a container under pressure materials which have a tendency to harden, cake or otherwise clog the outlet or dispensing passage of the device when exposed to air or to become contaminated by exposure to air, such device having means for purging the passage, after a dispensing operation, of all material residue left therein.

It is also an object of the invention to provide a dispensing device which includes means for utilizing the gas in the head space of the container, to which the device is connected for controlling the discharge of material therefrom, for purging the outlet passage of the device of material residue left therein after the dispensing operation.

It is also an object of the invention to provide a material dispensing device, of either the metering or non-metering type, which includes means operable, upon completion of the material dispensing operation, for purging the outlet passage of the device of material residue by passing gas from the head space in the material container therethrough.

Another object of the invention is to provide a dispensing device for controlling the discharge of materal under pressure from a container having a head space of gas above the material, the device including a valve housing, having inlet and outlet means therefor, through which all the material being dispensed must pass, a movable valving means operable for opening the outlet means to the atmosphere and providing a dispensing passage therefrom whereby the material is discharged through the valve housing, and means for purging the dispensing passage of material residue after the dispensing operation, the purging means including an orifice for communicating the interior of the valve housing with the head space in the container and means operable by the valving means, after the completion of the dispensing operation, for closing the inlet means to the valve housing, whereby only the gas from the head space in the container discharges through the housing and outlet means to purge the material residue from the dispensing passage.

Another object of the invention is to provide a metering or non-metering dispensing device for controlling the discharge of material from a container having the material under pressure therein and a head space of gas above the material, the dispensing device including the conventional valve housing defining a chamber through which all the material being discharged must pass; inlet and outlet means for communicating the chamber respectively with the interior of the container below the level of the material therein and with the atmosphere; valving means operable for opening and closing the inlet and outlet means, the valving means including a reciprocable valve stem having an outer end portion provided with a dispensing passage open to the atmosphere and normally disposed outwardly of the chamber and movable inwardly thereof for opening the outlet means and communicating the chamber with the atmosphere and an inner end portion adapted in at least one position of the valve stem to close the inlet means; and means for purging the dispensing passage in the outer end portion of the valve stem of material residue after a dispensing operation, the purging means comprising a port formed in a wall of the valve housing for directly communicating the chamber with the head space of gas in the container; the valving means being operated by moving the valve stem to dispense the material and thereafter to cause the inner end portion of the stem to close the inlet means or retain the inlet means in closed position, whereby only gas enters the chamber from the head space in the container and escapes to the atmosphere through the dispensing passage for carrying material residue from the latter.

Still another object of the invention is to provide a non-metering dispensing device for controlling the discharge of materials under pressure from a container, the container portion above the material defining a head space having gas under pressure therein, the device comprising a valve housing mounted on the container and defining a chamber through which all the material being discharged must pass; inlet and outlet means for communicating the chamber respectively with the interior of the container below the level of the material therein and with the atmosphere; a reciprocable valve stem for operating the device by controlling the flow of material through the inlet and outlet means, the valve stem having an outer end portion provided with a dispensing passage normally disposed outwardly of the chamber and movable inwardly thereof when the device is operated to open the outlet means and communicate the chamber with the atmosphere and an inner end portion normally closing the inlet means and movable when the device is operated to open the inlet means so that material may enter the chamber from the container to be discharged, the inner end portion of the valve stem being adapted to reclose the inlet means after a dispensing operation and prior to the outlet means being closed by the dispensing passage moving outwardly of the chamber; and a purging port formed in a wall of the housing for directly communicating the chamber with the head space in the container; whereby, on completion of the dispensing operation, after the inlet means is closed and before the dispensing passage moves outwardly of the chamber, gas alone is enabled to flow from the head space through the chamber and dispensing passage to the atmosphere for purging the passage of material residue left therein.

It is further an object of the invention to provide a metering dispensing device for controlling the discharge of measured quantities of material under pressure from a container in which the upper portion thereof above the material defines a head space having gas under pressure therein, the device including a valve housing defining a measuring chamber for the material being discharged, the chamber having inlet and outlet means for respectively communicating it with the interior of the container below the level of the material therein and with the atmosphere; a reciprocable valve stem movable for controllably opening and closing the inlet and outlet means for operating the device, the valve stem having an outer end portion provided with a dispensing passage normally disposed outwardly of the chamber and movable inwardly thereof to open the outlet means and communicate the chamber with the atmosphere and an inner end portion cooperable with the inlet means for closing the latter when the dispensing passage is moved inwardly of the chamber to open the outlet means for confining in the chamber a measured quantity of material to be discharged; and means for purging the dispensing passage of material residue after a dispensing operation, the purging means including an orifice formed in a wall of the valve housing for directly communicating the chamber with the head space in the container and a closure member carried by the valve stem for normally closing the orifice, the closure member being movable by the valve stem to open the orifice after a dispensing operation and while the inlet means is maintained closed by the inner end portion of the valve stem, whereby gas alone is enabled to pass from the head space through the chamber and dispensing passage and outwardly to the atmosphere for purging the passage of material residue left therein.

Other objects and advantages of the invention will be apparent from the specification and claims, when considered in connection with the attached sheets of drawings, illustrating one form of the invention, wherein like characters represent like parts and in which:

FIGURE 1 is a fragmentary elevational view, in section, showing a non-metering dispensing device, embodying the invention, in non-dispensing position;

FIG. 2 is similar to FIG. 1, but shows the device in material dispensing position;

FIG. 3 is also similar to FIG. 1, but shows the device in residue purging position;

FIG. 4 is a fragmentary elevational view, partially in section, showing a modification of the device of FIGS. 1 to 3; and FIGS. 5 through 7 are fragmentary elevational views, in section, of a metering dispensing device, according to the invention, showing the device, respectively, in non-dispensing, dispensing and purging positions.

Referring now to the drawings for a more detailed description of the invention, in FIGS. 1 to 3 a dispensing device 10, embodying the invention, is shown mounted on a container 11 having therein the material 12 under pressure of a propellent, the portion of the container above the material defining a head space 13 having gas under pressure therein.

It is here noted that, as used throughout the specification and claims, the term propellent may include liquid propellents, gaseous propellents or combinations thereof as are well known in the dispensing art, the only limitation thereon being that dictated by the particular structure of the dispensing device used, and the term gas, when referring to the head space, may include an immiscible propellent such as nitrogen or the vapor phase of a liquid propellent such as freon.

In the embodiment of the invention shown in FIGS. 1 to 3 of the drawings the dispensing device 10 is of the type commonly referred to as a standard or non-metering valve designed to continuously dispense or discharge material from the container so long as the device is being operated. While the concepts of the invention are applicable to many types of standard valves, in the herein illustrated form of the invention, the device 10 is shown to include a valve housing 14 mounted in the open end of the container 11 by means of a laterally extending mounting portion 15 crimped or similarly secured to the valve housing and connected to the mouth 16 of the container at the open end thereof.

The valve housing 14, which defines a chamber 17, through which all of the material being discharged must pass, includes the conventional inlet and outlet means for communicating the chamber 17, respectively, with the interior of the container below the level of the material therein and with the atmosphere. Movable valving means are provided for operating the device 10 and opening and closing the inlet means and outlet means, as is well known in the art.

While the inlet and outlet means of the valve housing 14 and the valving means may take any form known to the art, so long as they are designed so that the inlet and outlet means is normally closed in the non-dispensing position of the valve means and is opened in the dispensing position thereof, in the herein illustrated form of the invention the inlet and outlet means are formed, respectively, in the inner and outer end walls 18 and 19 of the valve housing and are cooperable with a reciprocable valve stem 20, forming the valving means. As shown, the outer end wall 19 of the housing is formed by a resilient member 21 having a bore 22 therethrough, through which the outer end portion 23 of the valve stem slidably projects. The outer end portion of the valve stem is formed with a dispensing passage 24, including a longitudinally extending passage 24a and an orifice 24b, formed in the wall of the passage 24a for opening the inner end of the latter laterally outwardly of the valve stem. The dispensing passage 24 is normally disposed outwardly of the valve housing chamber 17 and movable inwardly thereof, when the valve stem is moved from non-dispensing to dispensing position, for opening the outlet means and communicating the chamber with the atmosphere. Adjacent the outer end of the valve stem and forming part thereof is an enlarged intermediate portion 25 adapted to abut the inner surface of resilient member 21 when the valve stem is in outwardly projected non-dispensing position for sealing the outlet means, whereby the chamber 17 is sealed from the atmosphere.

The inner end wall 18 of the housing is formed by a resilient member 26 seated on a shoulder 27 formed integral with and projecting inwardly from the side wall of the housing. The resilient member 26 is provided with a bore 28 for movably sealably receiving the inner end portion 29 of the valve stem whereby the inlet means is closed. The inlet means defined by the bore 28 of the inner end wall 18 communicates with the interior of the container below the level of the material therein through a dip tube or similar means 30 connected thereto. In the illustrated embodiment of the invention the dip tube is connected to a depending projection 31 forming an integral part of the valve housing.

The valve stem 20, which is normally urged to outwardly projecting non-dispensing position by means of a spring or similar resilient member 32 bearing against the enlarged intermediate portion 25 and a washer 33 seated on resilient member 26, is formed of reduced diameter or is provided with channels as shown at 34 substantially intermediate the enlarged portion 25 and the inner end portion 29 of the valve stem. The channeled or reduced portion 34 of the valve stem is spaced from the inner end portion 29 of the valve stem, so that, on movement of the valve stem against the urging means 32 into dispensing position with the outlet means open, the portion 34 moves into the bore 28, thus providing a passage whereby the inlet means is opened and material is enabled to flow into the chamber from the container to be discharged to the atmosphere.

As will be readily understood by those conversant with dispensing devices of this type, the valve is operated to discharge material from the container by moving the valve stem 20, from the non-dispensing position shown in FIG. 1, inwardly against urging means 32, to the dispensing position shown in FIG. 2, wherein the dispensing passage 24 is disposed inwardly of the chamber to open the outlet means, and the inlet passage 34 is disposed in bore 28 to open the inlet means, whereby the material to be discharged is enabled to move up the dip tube and through the passage defined by the channel 34 around the seal 26, into the chamber and outwardly to the atmosphere through the dispensing passage.

While dispensing devices of the type above described have long been known in the art, it has been found that when certain materials are dispensed there is a tendency for the residue of the discharged material to harden or clog the dispensing passage 24 upon completion of a dispensing operation, as a result of its continued exposure to air, or in some cases for the material residue to be contaminated by such exposure to air. According to the present invention this problem is overcome by providing means for purging the dispensing passage 24 of material residue after the material has been dispensed, but prior to movement of the dispensing passage outwardly of the chamber 17.

As illustrated, this is accomplished by providing a port or orifice 35 in the side wall of the housing which directly communicates the chamber 17 with the head space 13 in the container. It will be seen that this direct communication permits gas, housed in the head space, to enter the chamber and pass outwardly thereof to the atmosphere, through the dispensing passage, when the latter is still disposed inwardly of the chamber. In order to facilitate purging of the dispensing passing 24 by utilizing the gas in the head space 13, it is necessary to stop the flow of material through the chamber 17 before the dispensing passage moves outwardly of the chamber and, accordingly, it is necessary that the inlet means to the chamber be closed before the outlet means is closed. In the embodiment of the invention illustrated, this is accomplished by positioning the inlet passage or channel means 34 of the valve stem in such a manner relative to the inner end portion 29 of the valve stem that, on movement of the valve stem to dispensing position, the dispensing passage 24 in the outer end portion of the valve stem moves into the chamber 17 before the inlet passage moves into the bore 28 and, on return of the valve stem to non-dispensing position, the inlet passage moves out of the bore 28 for sealing the inlet means before the dispensing passage moves outwardly of the chamber.

According to the invention after the dispensing operation is completed and on release of the valve stem for its return to normal position under the impetus of the urging means 32, the inlet port means is closed (see FIG. 3) just prior to movement of the dispensing passage 24 outwardly of the chamber, thereby permitting gas alone to pass from the head space through the chamber and dispensing passage outwardly to the atmosphere. This passage of gas alone to the atmosphere carries the material residue out of the dispensing passage, thus purging the dispensing passage and preventing clogging thereof or material contamination.

It is here noted that the dispensing device 10 above described may, as is well known in the art, be provided with an actuator button 36 frictionally mounted on the valve stem to facilitate imparting movement thereto. The button, which is here shown to be guided by an annular guide 37 carried by the valve mounting means 15, is provided with a passage 38 openly communicating with the dispensing passage 24 in the valve stem for directing the material therefrom to the atmosphere.

While dispensing devices 10 having purging means, as above described, function to dispense the material and thereafter purge the dispensing passage of material residue as desired, it is contemplated that under certain circumstances it may be necessary to control the movement of the valve stem so that the desired dispensing and purging results are achieved. It has been found that on occasion, dispensing devices of this type may be improperly operated so that an excessive quantity of gas is bled from the head space in the container before the inlet means is opened and discharge of material commenced. Also, it has been found that when the valve stem is released to permit its return to non-dispensing position, too rapid movement of the valve stem will greatly limit the quantity of gas flowing to the atmosphere and thereby prevent complete purging of the dispensing passage.

In order to overcome these problems and provide the desired control over movement of the valve stem, the dispensing device may be modified as shown in FIG. 4. The button 36 may be formed with a recess 39, in the form of a peripheral groove therearound, or the like, for removably receiving a detent 40 carried by the annular guide 37. The detent, which is preferably in the form of a ball bearing 41 or the like disposed in a recess 42 in the guide 37 is resiliently biased by a spring 43 bearing thereagainst to project outwardly of the recess and into the groove 39 of the button 36. The spring 43 may be held in the recess 42 and its pressure against bore 41 be controlled by a set screw 43a or the like threaded into the recess as shown. It will be seen that when the dispensing device 10 is to be operated, sufficient pressure must be applied against the button 36, to move the valve stem 20 so that the detent is moved against its normal bias to be displaced from the groove 39. The pressure required to remove the detent from groove 39 will result in a rapid follow through movement of the valve stem to full dispensing position, thus limiting the amount of gas which is bled from the head space before the dispensing of material has begun. Thereafter, on release of the actuator button to permit the valve stem to return to its normal non-dispensing position, frictional engagement of the detent with the outer surface of the actuator button, as the latter moves outwardly of annular guide 37, will slow the return of the valve stem to its normal position and thus permit sufficient gas to vent from the head space for purging the dispensing passage 24 as required.

Referring now to FIGS. 5 through 7 of the drawings, a dispensing device 44, adapted to discharge measured quantities of material on each operation thereof is shown embodying the concepts of the invention. The device 44, which is similar in many features of its construction with the device 10, discussed in connection with FIGS. 1 to 4, and is mounted on a container 11 in a similar manner thereto, differs from the previously discussed device, as is well understood in the art, in that the chamber 17 is designed to isolate measured quantities of material when the device is operated so that only a predetermined quantity of material is discharged. In order to achieve this result, the leading end 29 of the reciprocable valve stem 20 is formed with a flat 45 or other form of inlet passage means so that when the valve stem is in its normal non-dispensing position and the leading end is disposed in the bore 28 of the inlet means the chamber 17 is openly communicated with the interior of the container 11 below the level of the material therein. The portion 46 of the valve stem disposed between the leading end 29 thereof and the enlarged intermediate portion 25 is of a diameter sufficient to sealably close the bore 28 and consequently the inlet means when the valve stem is moved inwardly of the valve housing from non-dispensing to dispensing position.

As is well understood, metering dispensing devices of this type are operated by moving the valve stem from normal non-dispensing position, as shown in FIG. 5, to close the inlet means for trapping the material to be discharged in the chamber and thereafter opening the outlet means to permit such trapped material to be discharged to the atmosphere, as shown in FIG. 6.

In accordance with the instant invention, the valve housing 14 is provided with the purging orifice 35 for directly communicating the chamber 17 with the head space 13 in the container. However, since it is necessary, in order to discharge a predetermined quantity of material on each operation of the valve for the chamber to be completely isolated from the container, means are provided for closing the orifice 35 when the valve stem is in its normal non-dispensing position and through movement thereof to full dispensing position. As shown, the orifice closing means comprises a member 47, carried by the valve stem and engageable with the wall of the chamber 17, for closing the orifice in the non-dispensing position of the valve stem and maintaining the orifice closed throughout movement of the valve stem to full dispensing position. In the illustrated form of the invention the closure member 47 comprises a depending skirt 47a formed integral with the enlarged intermediate portion 25 of the valve stem. The skirt, as illustrated, is formed with at least one opening 47b for permitting the passage of material therethrough when the valve stem is in its normal and dispensing positions, so that the measuring chamber 17 may be completely filled with material and, thereafter, the material in the chamber may be completely discharged.

As will be readily understood, in order to purge the dispensing passage 24 of the valve stem upon completion of a dispensing operation, the valve stem is moved inwardly of the chamber beyond the point at which the material is discharged so that the closure member 47 passes beyond the orifice 35 and uncovers the same to permit the free flow of gas from the head space, into the chamber, and outwardly to the atmosphere through the dispensing passage 24. It will be seen that the purging operation is merely the result of continued movement of the valve stem upon completion of the dispensing operation.

It may be desired under certain circumstances, to control movement of the valve stem so that purging is not automatically the result of movement of the valve stem to dispensing position and to prevent the excessive venting of gas from the head space under circumstances where the valve stem is held in dispensing position for too long a time. In the form of the invention illustrated in FIGS. 5 through 7, inward movement of the valve stem is controlled by a stop member 48 mounted in the actuator button 36 and adapted to engage the edge of guide 37 on inward movement of the valve stem. The stop member is movably mounted in a transverse opening 49 formed in the actuator button and is resiliently biased to project outwardly thereof by a spring 50 or similar means. In FIG. 5 it will be seen that the stop member 48 normally projects outwardly of the surface of the actuator button and when the latter is moved to the dispensing position shown in FIG. 6 it engages an edge of the guide 37 for preventing further inward movement of the valve stem. When it is desired to purge dispensing passage 24 of material residue the stop member 48 is moved inwardly of the surface of the actuator button against the force of the spring 50, as shown in FIG. 7, to permit continued inward movement of the valve stem, beyond full dispensing position, so that the orifice 35 is uncovered and gas permitted to escape for purging the device.

Thus, among others, the several objects and advantages of the invention as aforenoted are achieved. Obviously numerous changes in the structure may be resorted to without departing from the spirit of the invention as defined by the claims.

I claim:

1. A metering dispensing device for controlling the discharge of measured quantities of material under pressure of a propellent from a container, the portion of the container above the material defining a head space having gas under pressure therein, said dispensing device comprising a housing defining a measuring chamber for the material being discharged; means having a bore therethrough forming an outer end wall of said housing; means for mounting said housing in an opening in the container for closing the same; a valve stem movably mounted in said housing for operating said device and controlling the discharge of material therefrom, said valve stem being formed with an inner end portion disposed within said measuring chamber and an outer end portion slidable within said bore of said outer end wall of said housing and projecting outwardly thereof, said outer end portion having a material dispensing passage therethrough open to the atmosphere, means normally urging said valve stem into outwardly projected non-dispensing position with said dispensing passage disposed outwardly of said measuring chamber; inlet port means for communicating said measuring chamber with the interior of said container below the level of the material therein when said valve stem is in its normal outwardly projected position and cooperable with the inner end of the valve stem to be sealably closed thereby when said valve stem is moved inwardly of said measuring chamber; and means for purging said dispensing passage in said valve stem of material residue after the dispensing operation, said purging means including an orifice formed in a wall of said housing for directly communicating said measuring chamber with the head space of gas in the container and means normally closing said orifice and operable by said valve stem for opening the same; said dispensing device being operated by moving said valve stem inwardly of said measuring chamber against said urging means for moving said dispensing passage inwardly of said chamber and closing said inlet port means, whereby said material trapped in said measuring chamber is discharged to the atmosphere, and, thereafter, on continued inward movement of said valve stem with said inlet port means maintained closed said orifice is caused to be opened, whereby gas alone vents through said orifice from the head space in the container through said measuring chamber and outwardly to the atmosphere for purging the dispensing passage of material residue left therein.

2. A metering dispensing device as defined in claim 1, wherein said means closing said orifice is mounted on said valve stem inwardly of said measuring chamber and is movable therewith, said means closing said orifice in the non-dispensing and dispensing positions of said valve stem and opening said orifice when the valve stem is moved inwardly of the measuring chamber beyond dispensing position.

3. A metering dispensing device as defined in claim 1, in which said valve stem is longitudinally reciprocable and said purging orifice is formed in a wall of the housing parallel to the path of movement of the valve stem, and wherein said means for closing said orifice comprises a member mounted on said valve stem having a flange extending parallel thereto and in engagement with said housing wall, said flange being of sufficient width to cover said orifice for closing the same when the valve stem is in non-dispensing position and through movement of the valve stem to full dispensing position, the flange being moved to uncover said orifice when the valve stem is moved beyond full dispensing position, thereby enabling gas to flow into the chamber for purging the dispensing passage.

4. A metering dispensing device for controlling the discharge of measured quantities of material under pressure of a propellent from a container, the portion of the container above the material defining a head space having gas under pressure therein, said dispensing device comprising a housing defining a measuring chamber having a normally open inlet port for receiving the material in the container and a normally closed outlet port for dispensing the material from the housing, a reciprocating valve stem having a dispensing nozzle on the outer end thereof, said valve stem being normally urged to a projecting position and having means for first closing the inlet port and thereafter opening the outlet port in response to inward movement of the stem from said normal position to dispense the measured quantity of material from said chamber, a purging port in the side of the housing communicating said chamber with the said head space, and means controlled by said valve stem for normally sealing said purging port until the valve stem has been moved inwardly to a position in which the material has been dispensed from the housing after which the purging port is unsealed by continued inward movement of the stem and gas from said head space flows through said purging port, outlet port and nozzle to purge the same of any material remaining therein.

5. The invention as defined in claim 4 wherein the housing has a smooth inner surface and the last means comprises a member in sealing relation with said surface and carried by said stem to move therewith.

6. The invention as defined in claim 5 wherein said member comprises a depending skirt on said stem intermediate the ends thereof.

7. The invention as defined in claim 6 wherein the skirt is formed integrally with said stem.

References Cited

UNITED STATES PATENTS

| | | | |
|---|---|---|---|
| 1,706,808 | 3/1929 | Nye et al. | 251—64 X |
| 1,978,596 | 10/1934 | Otte | 222—149 |
| 2,240,030 | 4/1941 | Bobrick et al. | |
| 2,637,338 | 5/1953 | Troendle | 251—64 X |
| 2,686,652 | 8/1954 | Carlson et al. | 222—402.11 X |
| 2,867,356 | 1/1959 | Thomas | 222—148 |
| 2,968,427 | 1/1961 | Meshberg | 222—402.20 |
| 3,033,473 | 5/1962 | Kitabayashi | 239—579 |
| 3,187,953 | 6/1965 | Ferguson | 222—149 |
| 3,191,816 | 6/1965 | Fead et al. | 222—402.18 X |
| 3,283,962 | 11/1966 | Whitmore | 222—402.18 X |

RAPHAEL M. LUPO, *Primary Examiner.*